United States Patent
Lee

(10) Patent No.: US 6,465,591 B1
(45) Date of Patent: Oct. 15, 2002

(54) ACRYLIC EMULSION COATING FOR FILMS, PAPER AND RUBBER

(75) Inventor: Ivan S. Lee, Arcadia, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/556,236

(22) Filed: Apr. 24, 2000

(51) Int. Cl.$^7$ .................... C08F 26/08; C08F 26/10; B32B 27/30

(52) U.S. Cl. ................. 526/264; 2/161.6; 2/161.7; 2/167; 2/168; 264/255; 264/306; 428/341; 428/356; 428/483; 428/492; 428/493; 428/514; 428/520; 428/522; 526/317.1; 526/319; 526/346

(58) Field of Search .............. 526/264, 317.1, 526/319, 346; 428/341, 492, 493, 483, 514, 520, 522, 356; 2/161.6, 161.7, 167, 168; 264/255, 306

(56) References Cited

U.S. PATENT DOCUMENTS

| | | | |
|---|---|---|---|
| 2,795,564 A | 6/1957 | Conn et al. ................. 260/29.6 |
| 3,025,403 A | 3/1962 | Belknap et al. ............. 250/108 |
| 3,185,751 A | 5/1965 | Sutton ........................ 264/301 |
| 3,255,492 A | 6/1966 | Velonis et al. ................. 18/41 |
| 3,286,011 A | 11/1966 | Kavalir et al. ............. 264/306 |
| 3,411,982 A | 11/1968 | Kavalir et al. ............. 161/242 |
| 3,808,287 A | 4/1974 | Thomas ...................... 260/827 |
| 3,813,695 A | 6/1974 | Podell, Jr. ...................... 2/168 |
| 3,856,561 A | 12/1974 | Esemplare et al. ......... 117/139 |
| 3,933,702 A | 1/1976 | Caimi et al. ............... 260/17 R |
| 3,959,554 A | 5/1976 | Hick .......................... 428/336 |
| 4,027,060 A | 5/1977 | Esemplare et al. ......... 428/212 |
| 4,082,862 A | 4/1978 | Esemplare et al. ......... 427/133 |
| 4,302,852 A | 12/1981 | Joung ............................ 2/167 |
| 4,304,008 A | 12/1981 | Joung ............................ 2/167 |
| 4,310,928 A | 1/1982 | Joung ............................ 2/161 |
| 4,752,639 A | 6/1988 | Haller et al. .................. 525/66 |
| 4,826,907 A | 5/1989 | Murao et al. ................ 524/394 |
| 4,994,538 A | 2/1991 | Lee ............................. 526/279 |
| 5,026,448 A | 6/1991 | Reafler et al. ............... 156/212 |
| 5,069,965 A | 12/1991 | Esemplare et al. ......... 428/330 |
| 5,084,514 A | 1/1992 | Szczechura et al. ........ 525/123 |
| 5,171,809 A | 12/1992 | Hilty et al. .................. 526/279 |
| 5,202,368 A | 4/1993 | Davies et al. ............... 524/266 |
| 5,214,095 A | 5/1993 | Lavoie ........................ 524/806 |
| 5,216,057 A | 6/1993 | Pratt et al. .................. 524/269 |
| 5,234,736 A | 8/1993 | Lee .............................. 428/42 |
| 5,306,558 A | 4/1994 | Takahashi et al. .......... 428/331 |
| 5,534,350 A | 7/1996 | Liou ........................ 428/423.1 |
| 5,571,219 A | 11/1996 | Gorton ........................ 2/161.7 |
| 5,603,996 A | 2/1997 | Overcash et al. .......... 428/34.2 |
| 5,661,208 A | 8/1997 | Estes .......................... 524/457 |
| 5,691,069 A | 11/1997 | Lee ............................. 428/500 |
| 5,700,585 A | 12/1997 | Lee ............................. 428/500 |
| 5,712,346 A | 1/1998 | Lee ............................. 525/288 |
| 5,716,685 A | 2/1998 | Kumar et al. .............. 428/40.1 |
| 5,993,923 A | 11/1999 | Lee ............................ 428/36.8 |

FOREIGN PATENT DOCUMENTS

| | | |
|---|---|---|
| CA | A-2128670 | 2/1995 |
| EP | 0 455 323 A2 | 11/1991 |
| EP | 0 543 657 B1 | 5/1993 |
| EP | 0 543 657 A1 | 5/1993 |
| EP | 0 640 623 A2 | 3/1995 |
| EP | 0 757 059 A1 | 2/1997 |
| GB | 806142 | 12/1956 |
| GB | 1052546 | 12/1966 |
| WO | WO 84/00908 | 3/1984 |
| WO | WO 91/05657 | 5/1991 |
| WO | WO 95/29196 | 11/1995 |
| WO | WO 96/25279 | 8/1996 |

OTHER PUBLICATIONS

Russell D. Culp and Bradley L. Pugh; *Natural Rubber Dipping Technologies*, Symposium on Latex as a Barrier Material, University of Maryland, Apr. 6 and 7, 1989, pp. 1–15.

T. D. Pendle, & A. D. T. Gorton; *Dipping With Natural Rubber Latex*, NR Technical Bulletin, The Malaysian Rubber Producers Research Association, pp. 1–12. (1995).

J. S. Sadowski, B. Martin and D. D. Gerst; *Polyurethane Latexes for Coagulation Dipping*; Hughson Chemicals, Lord Corp., Erie, PA., Aug. 1978; pp. 14–17.

Primary Examiner—D. S. Nakarani
(74) Attorney, Agent, or Firm—Christie, Parker & Hale, LLP

(57) ABSTRACT

A polymer useful in forming coatings for articles is provided. The polymer is an acrylic copolymer formed as the reaction product of a plurality of monomers which include an alkyl (meth)acrylate, a quaternary amine (meth)acrylate, a hydroxyalkyl (meth)acrylate, an N-vinyl lactam, an ethylenically unsaturated carboxylic acid, and a fluorinated (meth)acrylate. The polymer is formed in the presence of surfactants, preferably by sequential polymerization of two separate monomer mixtures. To form a coating, the polymer is blended with an elastomeric material such as nitrile rubber latex. The resulting coating is useful both as a print coating for substrates used with ink jet printers and as a coating for rubber articles.

70 Claims, No Drawings

ACRYLIC EMULSION COATING FOR FILMS, PAPER AND RUBBER

FIELD OF THE INVENTION

The present invention is directed to an acrylic polymer emulsion, which, when blended with an elastomeric material can be used as a coating for use on various products. One especially useful application is for coating a film or paper substrate for use as a sheet upon which images may be printed with ink jet printers. When applied to paper or film to produce print sheets, the coating provides a high quality, clear, glossy surface that freely receives water based inks such as are commonly used with ink jet printers. These properties make print sheets coated with the polymer especially useful as photographic quality papers and transparencies for use with ink jet printers. Another application for the polymer is for coating rubber articles such as gloves. When applied to such rubber articles, excellent mold release, donning and anti-blocking properties can be achieved.

BACKGROUND OF THE INVENTION

Ink jet printing is a well-known and commonly used means of producing an image onto a substrate. Ink jet printers typically use one of two different types of ink, dye-based inks and pigment-based inks. With dye-based ink, the color of the ink is imparted by a dye that is soluble in a fluid carrier. The fluid carrier is typically a blend of water and glycol. Such dye-based inks are relatively inexpensive and easy to process, and are suitable for use in low cost applications in which long term durability is not a concern. In pigment-based inks, the color is imparted by particles that are dispersed, rather than dissolved, in a fluid carrier. Water-soluble fluids are typically used as the carrier for pigment-based ink for improved lightfastness.

Some of the most recent advances in ink jet printer technology have been in the area of photo-quality or near photo-quality printing. While printers and inks are able to achieve the high resolution necessary for photo-quality printing, many of the printing papers and other printing films (such papers and films collectively referred to in this specification as "facestocks") available to the consumer fail to permit the consumer to take full advantage of the printer's capabilities. A first shortcoming is that many of the photo-quality facestocks that are capable of high-resolution photo-quality printing do not impart sufficient glossiness to match that of prints made on photographic paper by traditional photographic techniques. A second shortcoming is that many of the photo-quality facestocks with the desired glossiness are incapable of the high resolution desired for a photo-quality print. To the extent that some facestocks have been able to achieve both high gloss and high resolution, still further problems such as slow dry times are often realized. It is important that the ink applied to a facestock be able to dry fast to permit the handling of the print soon after printing, and to allow printed sheets to be stacked in a printer's output tray without resulting in any smearing the printed images.

In order to meet the print facestock requirements for high gloss, good ink absorbency and fast print drying, prior art ink jet facestock technology often relies on the use of various coatings which are applied to a substrate. For many such coatings, multiple layers are required which tend to require elaborate, and therefore, expensive manufacturing techniques. Many coatings also require mechanical treatment such as the use of a polished casting drum in order to achieve the desired glossiness, a step that still further adds to the manufacturing cost. Moreover, such facestocks still tend to be slow drying, making them susceptible to smearing of the printed images. Improved facestock coatings that are fast drying, glossy and capable of high-resolution are desired for the production of facestocks used for photo-quality computer printing applications.

Rubber articles made from natural or synthetic rubber include surgical gloves, physician examining gloves, industrial work gloves, prophylactics, catheters, balloons, tubing, sheeting and the like. Some of these articles, and in particular gloves, require good donning properties, that is, the ability of the rubber article to be slid on and off skin surfaces without undue clinging or friction. Surgical gloves require good wet donning properties, that is, the ability to be slid over damp or wet skin surfaces. Physician examining gloves and industrial work gloves require good dry donning properties, that is, the ability to be slid over dry skin surfaces.

The comfort of such a glove, whether worn for surgical use, examination use, or industrial use, can generally be improved, especially if the glove is worn for a prolonged period of time, if the inside of the glove is absorbent. Furthermore, good absorbency properties in which the buildup of moisture within a glove is prevented can improve the wearer's dexterity. However, while absorbency is desirable, the absorbency of a rubber article such as a rubber glove cannot be permitted to compromise the barrier properties required of such gloves.

Another desirable property for gloves and other rubber articles is that the outer surfaces permit such articles to be stacked against one another without sticking or "blocking" to one another. Of course, neither should the interior of a glove or other rubber article stick to itself as such blocking makes donning difficult.

It is also desirable that any coating that is to be applied to the mold side of the article impart good mold release properties. Without good mold release properties, the finished articles can be difficult to remove from the molds, especially if mechanical devices are used for stripping the finished articles from the molds. Without good mold release properties, a significant number of articles may be torn during the stripping step. Yet another benefit of a coating with good mold release properties is that it simplifies the cleaning of the mold. This is important, as a single mold should be capable of producing a large number of articles without having to be taken off the manufacturing line for elaborate cleaning procedures.

To achieve the desirable characteristics for gloves and other rubber articles, various coatings have been developed. Such coatings can be applied to the inner, outer, or both surfaces of the rubber article. One of the simplest coatings has been to apply a powder such as talc or cornstarch to the surfaces of the article. The use of such a powder improves both the donning and blocking characteristics of such gloves.

The conventional way of manufacturing rubber articles such as powdered gloves has been to dip a mold or former, having the shape of the article to be formed, into a coagulant slurry containing both powder and a coagulant such as calcium nitrate or calcium carbonate. After drying, the mold is immersed in a rubber emulsion for a time sufficient for the rubber to coagulate and form a coating of desired thickness. Water leaching is generally employed as the next step in order to remove rubber impurities. Once the leaching process has been completed, the rubber article is then cured and dipped into a starch slurry. The starch-coated surface is then dried, leaving a coating of powder on the surface of the glove. After cooling, the rubber article is stripped from the mold. For most rubber articles, the stripping step results in the glove being turned inside out. The mold is then cleaned and used again for making another article.

An important drawback to the use of powder-coated gloves and other articles is that for many applications, the powder can contaminate the environment in which the wearer of the article is working. For example, for certain surgical procedures, powder-coated gloves are unacceptable as such a powder coating can contaminate the surgical field. Similarly, for gloves worn in clean rooms such as are commonly found in the electronics industry, the powder coating of a rubber glove can cause undesirable contamination of the clean room. Therefore, coatings are desired which can achieve the desirable donning and blocking properties for rubber articles without the use of powders.

Methods and materials used for glove manufacture are described, for instance, in U.S. Pat. Nos. 3,411,982 and 3,286,011 to Kavalier et al., both incorporated herein by reference, "Polyurethane Latexes for Coagulation Dipping," Sadowski et al., Elastomerics, August 1979, pp. 17–20, incorporated herein by reference, and "Dipping with Natural Rubber Latex," Pendler et al., Natural Rubber Technical Bulletin, 1980, also incorporated herein by reference.

One way to eliminate the traditional powder coatings for gloves has been through the use of one of various surface treatment methods for the finished article. One such surface treatment method requires the halogenation of the surface of the article. Chlorination is the most commonly used of such methods. However, while effective, such treatments are often expensive. Moreover, they often have adverse affects on the shelf life of the rubber articles formed. It would be desirable to provide a rubber article with a powder-free donning surface without resorting to the expensive and article-deteriorating practices that are now commonly used. Such a process could substantially reduce the cost of manufacture and maximize the shelf life of the rubber article.

Other methods of making powder-free rubber articles such as gloves have included the use of coatings with silicon-based chemicals. However for the clean rooms employed in electronic chip manufacturing activities, the inclusion of silicon in the coatings is unacceptable as it can cause silicon contamination of delicate electronic components. Therefore, a coating for gloves and other rubber articles that is both powder-free and silicon-free while providing good donning, mold release and anti-blocking properties is desired.

SUMMARY OF THE INVENTION

The present invention sets forth a polymer emulsion useful for forming a coating a number of different products. The polymer emulsion is produced as the reaction product of a monomer mixture comprising an alkyl (meth)acrylate, a quaternary amine (meth)acrylate, a hydroxyalkyl (meth) acrylate, an N-vinyl lactam, an ethylenically unsaturated carboxylic acid, and a fluorinated (meth)acrylate. Additionally, a hard monomer and/or an ethoxylated (meth) acrylate monomer may be provided. The polymer emulsion is produced under vigorous mixing and preferably in the presence of a plurality of surfactants to further ensure good mixing. In the preferred embodiment, the polymer emulsion is made by a sequential polymerization reaction of two different monomer mixtures. For such a sequential polymerization reaction, the first monomer mixture is first allowed to partially react before the second monomer mixture is added to the reactor. Improved properties for the resulting polymer coating result when the second monomer mixture has a lower amount of ethylenically unsaturated carboxylic acid than the first monomer mixture. In particular, when such a sequential polymerization reaction is used, the resulting polymer emulsion has a lower viscosity at higher solids concentration than would otherwise be achieved if a single monomer mixture were reacted. By having a lower viscosity at a higher solids content, the polymer emulsion is far easier to handle.

The polymer emulsions of the present invention are useful in forming coatings for a variety of materials. As one example, the coatings can be applied to a facestock such as paper or vinyl in order to make a coated facestock for use in ink jet printing applications. Such coated facestocks exhibit excellent clarity and gloss characteristics, are fast drying and permit the printing of high-resolution photo-quality images using ink jet printers. Furthermore, even though such coated facestocks exhibit high gloss, they are still highly flexible and resist cracking and separation from the substrate. Moreover, the coated facestocks are easily fed through ink jet printers without causing jamming or other difficulties for the printer. Preferably, the coating is formed by diluting the polymer emulsion with an elastomeric material such as a nitrile rubber latex to a concentration of about 95% polymer emulsion. The coating is applied to a facestock at a dry coat weight of between about 10 and about 50 grams per square meter.

The polymer emulsions are additionally useful in forming coatings for rubber articles. For molded rubber articles, such coatings exhibit excellent mold release properties, even when mixed with a high concentration of coagulants such as calcium nitrate which are often used in the forming of nitrile rubber latex articles. In addition to outstanding mold release properties, the coatings provide excellent anti-blocking properties when applied to the outside surface of the rubber article. When applied to the inside surface of a rubber article such as a rubber glove, the coatings still further provide excellent donning properties, for both wet donning and dry donning applications. Moreover, the absorbency imparted to an article such as a glove whose inside surface is coated with the polymer coating of the present invention make the glove more comfortable to wear for extended periods of time. Preferably, such a polymer coating is formed by diluting the polymer emulsion with an elastomeric material such as a nitrile rubber latex. Preferably, the polymer emulsion is diluted with nitrile rubber latex to a concentration of about 25% by weight on a dry basis. The resulting emulsion of polymer and nitrile rubber latex is then diluted with water to a concentration of between about 2 and 8% solids to form a coating for a nitrile rubber article. Articles coated with the polymer coating of the present invention are strong, flexible and exhibit very high stretch without appreciable cracking or separation of the coating from the article. Such coatings can be applied to natural latex articles as well as to nitrile rubber latex articles.

DETAILED DESCRIPTION OF THE INVENTION

The polymer emulsions of the present invention are acrylic emulsion copolymers that are the reaction product of a mixture of monomers. In this specification, the term "monomer" is meant in a broad sense to encompass monomers and oligomers as would be used in building the desired copolymers. The monomers generally include one or more alkyl (meth)acrylate monomers. As used in this specification, the term (meth)acrylate is intended to refer to either an acrylate or a methacrylate. For example, the term alkyl (meth)acrylates is meant to refer to the group of chemicals that includes both alkyl acrylates and alkyl methacrylates.

The monomer mixture also includes one or more quaternary amine (meth)acrylate monomers, one or more hydroxyalkyl (meth)acrylate monomers, one or more N-vinyl lactam monomers, one or more ethylenically unsaturated carboxylic acid monomers and one or more fluorinated (meth)acrylate monomers. In the preferred embodiment, the monomer mixture further includes one or more hard monomers and one or more ethoxylated (meth)acrylate monomers.

The alkyl (meth)acrylates and hard monomers together generally provide the durability and glossiness to the polymer emulsions. Preferred alkyl (meth)acrylates are those having from 1 to 10 total carbon atoms. Examples of suitable alkyl (meth)acrylates monomers include methyl acrylate, ethyl acrylate, butyl acrylate, ethylhexyl acrylate, isooctyl acrylate, methyl methacrylate and isobutyl methacrylate. As used herein, the term "hard monomer" is meant to include monomers including alkyl (meth)acrylate and styrene monomers having a glass transition temperature ($T_g$) greater than room temperature or about 25° C. Examples of suitable hard monomers include alkyl (meth)acrylates monomers with a $T_g$ greater than about 25° C., such as methyl methacrylate and isobutyl methacrylate, and styrene and styrenic monomers.

While the use of at least one hard monomer is desired in the preferred embodiment for durability and to prevent tackiness of the resulting coatings, at least a portion of the one or more alkyl (meth)acrylates selected should also have a $T_g$ of less than 25° C. in order to prevent the coatings from being too brittle. Most preferably, a combination of alkyl (meth)acrylates and hard monomers should be selected to achieve the desired $T_g$ for the coating. In the preferred embodiment a combination of methyl acrylate, butyl acrylate and methyl methacrylate is provided. The one or more alkyl (meth)acrylates, are preferably provided in a total amount between about 60 and 80% by weight of the total reactants. The hard monomers are preferably provided in a total amount between about 5 and 15% by weight of the total reactants. It should be apparent to one of ordinary skill in the art that some alkyl (meth)acrylates such as methyl methacrylate or isobutyl methacrylate fall within the definition of a hard monomer as well as the definition for an alkyl(meth)acrylate. Therefore, to the extent the preferred embodiment calls for amounts of both types of monomers, the inclusion of an alkyl (meth)acrylate with a $T_g$ greater than 25° C. will satisfy both requirements.

Quaternary amine (meth)acrylates are cationic monomers that, when combined with the other monomers are considered to provide improved water absorbency properties to the coatings. The preferred quaternary amine (meth)acrylate is a product knows as Ageflex FA11Q80MC which is an 80% aqueous solution of dimethylaminoethyl acrylate methyl chloride quaternary available from CPS Chemical Co. of Old Bridge, N.J. The quaternary amine (meth)acrylate is preferably provided in an amount between about 5 and 15% by weight of the total monomers.

The hydroxyalkyl (meth)acrylate monomers are also generally considered as providing improved water absorbency characteristics to the coatings of the present invention. They also provide pigment-bonding properties that are especially useful for film coatings for printing applications using pigment-based inks. The preferred hydroxyalkyl (meth) acrylate monomer is 2-hydroxyethyl methacrylate (HEMA) such as that available from Mitsubishi Rayon Co., Ltd. of Tokyo, Japan. The hydroxyalkyl (meth)acrylate monomer is preferably provided in an amount between about 5 and 35% by weight of the total monomers.

The inclusion of one or more N-vinyl lactam monomers in the monomer mixture, together with the hydroxyalkyl (meth)acrylate monomers, is generally considered to help fix the dye to the coating when the coating is used for making coated facestocks for use with printers. The preferred N-vinyl lactam monomers are N-vinylcaprolactam monomers and the more preferred are vinyl pyrrolidones. The most preferred is N-vinylpyrrolidone. Such a product is available from ISP Technologies Inc. of Wayne, N. J. under the trade name V-PYROL/RC. Preferably, the N-vinylcaprolactam is provided in an amount between about 5 and 15% by weight of the total monomers.

The one or more ethylenically unsaturated carboxylic acids, when combined with the hydroxyalkyl (meth) acrylate, also helps to improve the water absorbency characteristics of the coatings. The preferred ethylenically unsaturated carboxylic acids are alkyl (meth)acrylic acids, carboxyethyl acrylates and itaconic acids. The most preferred ethylenically unsaturated carboxylic acids are acrylic acid and methacrylic acid. The preferred range for the ethylenically unsaturated carboxylic acids is between about 4 and 15% by weight of the total monomers. If less than about 4% of acid is provided, the resulting polymer coating tends to have too slow of a dry speed when coated to a film for use in an ink jet print film application.

The one or more fluorinated (meth)acrylate monomers tend to bloom to the surface of the coating once cured and are generally considered to prevent the coated articles from blocking. When the coating is used for coating facestock used for printing, the fluorinated (meth)acrylate monomers also helps the printer to better grip the facestock for feeding it into the printer. Surprisingly, this benefit is provided without adversely affecting the desirable glossiness of the coated facestock. When a coating with fluorinated (meth) acrylate monomers is used for producing coated rubber articles such as gloves, the resulting gloves have improved tactile feel. The preferred fluorinated (meth)acrylate monomer is trifluoroethyl methacrylate. Trifluoroethyl methacrylate is available from Elf Atochem North America of Philadelphia, Pa. under the trade name MATRIFE. Because the fluorinated (meth)acrylate monomers tend to bloom to the surface, very small amounts are effective at achieving the desired properties. Therefore, any positive amount of fluorinated (meth)acrylate monomer is preferred. Most preferably the fluorinated (meth)acrylate monomers are provided in an amount between about 0.1 and 5% by weight of the total monomers.

In one preferred embodiment, one or more ethoxylated (meth)acrylate monomers are also provided to the monomer mixture to act as an active surfactant to both improve the reaction conditions during polymerization and improve the properties of the coatings by reducing the surface tension. The preferred ethoxylated (meth)acrylate monomers are ethoxylated hydroxyalkyl (meth)acrylates with an average of between 5 and 20 ethylene oxide units. The most preferred are ethoxylated hydroxyalkyl (meth)acrylates with an average of between 10 and 15 ethylene oxide units. An ethoxylated hydroxyethylmethacrylate with an average of 15 ethylene oxide units is available in an 88% by weight solution with 12% by weight propyleneglycol monomethylether from Nippon Nyukazai Co., Ltd. of Tokyo, Japan under the product designation MA-150MF. An ethoxylated hydroxyethylmethacrylate with an average of 10 ethylene oxide units is available from Nippon Nyukazai Co., Ltd. under the product designation MA-100A. The ethoxylated (meth)acrylate is preferably provided in a positive amount between about 0 and 5% by weight of the total monomers, most preferably between about 0.1 and 5% by weight.

The coatings made from the polymer emulsions provided by the reaction of the individual monomer components set forth above need to be durable and flexible without being tacky on the one hand, or brittle on the other hand. As the individual monomers that make up the monomer mixture, with the exception of the low $T_g$ alkyl (meth)acrylates, tend to all have glass transition temperatures above room temperature, it is important to include at least some monomers with low $T_g$. Otherwise, if the concentration of monomers with high $T_g$ is too high, and an insufficient amount of monomers with low $T_g$ are included, the resulting coatings will tend to be too brittle. Therefore, the upper limits for the amount of each of the individual monomers is generally dictated by $T_g$ limitations.

The reaction of the monomers is carried out by known methods. In the preferred embodiment, a heated reactor is initially charged with deionized water and one or more surfactants. Because a number of monomers with different physical properties are being reacted, in the preferred embodiment, a number of different anionic and nonionic surfactants are provided, each selected for improving the miscibility of a particular monomer or group of monomers. The initial reactor charge is subjected to a nitrogen purge to remove oxygen, thereby reducing the extent of undesirable oxidation reactions. Because thorough agitation is critical to the reaction, vigorous agitation is started immediately and is continued throughout the reaction. A small amount of defoaming agent is also added at this time to reduce foaming of the reactants. A suitable defoaming agent is available from Drew Industrial Division of Ashland Chemical Company of Boonton, N.J. under the trade name Drewplus L-191. An amount of activator is also added. The most preferred activator is the sodium salt of ethylenediaminetetraacetic acid, iron(III), or Fe-EDTA, which further acts as an oxygen scavenger. Other preferred activators include ascorbic acid and sodium metabisulfite.

Prior to their introduction into the reactor, the monomers, except for the quaternary amine (meth)acrylate, are separately mixed with one another. The pH of the monomer mixture is measured and a base such as ammonia is added under good agitation to adjust the pH to within a slightly basic range. Preferably, a 16% ammonia solution is used to adjust the pH to within the range of about 7.5 to 8. The quaternary amine (meth)acrylate monomer is then added and the pH is again measured. At this point, the mixture tends to be slightly cloudy. Deionized water is added until the dispersion is clear under vigorous agitation. It is important that the mixture be clear as any cloudiness in the monomer mixtures can ultimately result in cloudiness in the coatings produced. It is also important to recognize that the mixtures should be maintained under constant agitation as without such agitation, the dispersions will quickly separate into two layers. However, if such separation occurs, the desired dispersion can again be achieved under vigorous agitation.

Once the reactor reaches a temperature of about 45° C., an initiator is introduced. Suitable initiators are water-soluble initiators such as azo bis(4-cyanovaleric acid) from Wako Pure Chemical Industries, Ltd. of Osaka, Japan, or tertiary-butyl hydroperoxide. Tertiary-butyl hydroperoxide is presently the most preferred. At this time, the nitrogen purge to the reactor is stopped and the monomer mixture is slowly added to the reactor along with an accelerator solution. A preferred accelerator is an aqueous solution of the sodium salt of hydroxymethanesulfinic acid. Such a product is available from Henkel of America, Inc. It is also important to recognize that the monomer mixture should be separately stirred during its addition to the reactor to prevent the individual ingredients of the monomer mixture from separating.

Upon the addition of the monomer mixture, the temperature of the reactor is allowed to rise due to the exothermic polymerization reaction. The reaction temperature is preferably maintained at between about 45° C. and 55° C., and most preferably between about 48° C. and 53° C. Once the monomer mixture has been completely added, the addition of the accelerator solution is continued for another about 40 to 60 minutes.

In order to complete the reaction, as a final cook-off, an additional amount of initiator is added to the reactor after the monomer mixture has been completely added to the reactor. The addition of the accelerator solution continues during this cook-off period. After the accelerator solution has been added, the mixture is kept warm for an additional about 30 minutes to complete the reaction. The reactor is then cooled. When the reactor temperature has fallen to about 35° C., a small amount of biocide is added along with deionized water to adjust the total solids content. At this time, the pH is also adjusted to within the range of 7.0 to 8.5 by the addition of a suitable base such as ammonia. For ease of handling, and also to simplify mixing, the polymer emulsion is preferably produced as an emulsion with about 35% solids by weight. The reaction products are then filtered to remove any grit.

In the preferred embodiment, rather than preparing the polymer emulsion as the reaction product of a single monomer mixture, two separate monomer mixtures are provided with different properties. Preferably the second monomer mixture includes a lower concentration of ethylenically unsaturated carboxylic acid monomers than the first monomer mixture. According to this embodiment, the first monomer mixture is first added to the reactor and at least partially reacted. The second monomer mixture is then slowly introduced and reacted. By using such a procedure, a procedure referred to herein as a "sequential polymerization" procedure, and by carefully selecting the properties of the first and second monomer mixtures, the resulting emulsion can be produced with high solids content at relatively low viscosity. Such sequentially polymerized emulsions also produce coatings with improved properties such as faster dry times for ink jet printer papers and films coated with the polymer coating. In contrast, if a single feed is used, a higher viscosity generally results, making handling of the resulting emulsion somewhat more difficult. Ink jet printer papers and films coated with a polymer coating produced by a single feed polymerization reaction tend to have slower dry speeds. Without being bound by theory, applicant believes that the sequential polymerization procedure causes the polymer particles to form as a core of a first polymer formed by the reaction products of the first monomer mixture with a shell surrounding the core, the shell being formed by the reaction products of the second monomer mixture.

Once the polymer emulsion is prepared, it can then be applied to an appropriate substrate by known methods. Preferably, the a coating material is produced by diluting the polymer emulsion with an elastomeric material such as a rubber emulsion, most preferably a nitrile rubber latex. When the polymer emulsion is to be used for coating a facestock for use as a coated facestock for printer applications, the polymer emulsion is preferably diluted with a nitrile rubber latex to a concentration of about 5% by weight on a solid basis. Most preferably, the nitrile rubber latex is provided as an aqueous emulsion at about 48% by weight solids. The preferred nitrile rubber latex is a carboxylated butadiene-acrylonitrile rubber latex. One such carboxylated butadiene-acrylonitrile rubber latex is available from Synthomer Ltd. of Harlow, Great Britain under the trade name Synthomer 6000. In the preferred embodiment, the nitrile rubber latex is first diluted to a concentration of about 35% by weight solids and then added to the polymer emulsion.

The polymer coating material is applied to a facestock at a preferred dry coat weight of at least about 10 grams per square meter (gsm). Preferably, less than about 50 gsm of coating material is provided. At coat weights of less than about 10 gsm, it can be difficult to obtain a uniform finish on the paper or film. Thinner coat weights will also result in papers and films that take longer to dry once printed. While coat weights greater than about 50 gsm are possible with good properties including good flexibility and extremely rapid drying properties, such coat weights can tend to be expensive, and therefore, are not generally preferred.

As already mentioned, the coating can be applied to any number of different facestocks including substrates such as paper, card stock, cardboard and vinyl, polyester, polyethylene and polypropylene films. An important benefit of the polymer coating of the present invention is that it adheres well to virtually any substrate. Consequently, the choice of substrates is not of critical importance in practicing the invention. Preferred coat weights for paper, card stock and cardboard are 18 to 24 gsm. Preferred coat weights for vinyl, polyester, polyethylene and polypropylene films are in the range of 20 to 30 gsm.

As stated, in the preferred embodiment, a facestock coated with the polymer of the present invention has high gloss characteristics. Such high gloss is achieved without any mechanical treatment methods such as those commonly employed in the production of prior art high-gloss coatings. However, for some applications, a lower gloss finish may be desirable. In order to achieve a matte finish, up to about 20% by weight of particles, preferably inert particles such as silicate crystals having an average particle size of 5–10 microns, may be added to the coating before it is applied to the substrate. Of course, any degree of gloss between a dull, matte finish and a high gloss finish can be achieved by varying the amount of particles added.

While coat weights of at least 15 gsm are generally desired for photographic quality printer paper, it has surprisingly been discovered that at low coat weights in the range of about 10 to 18 gsm, a coated film produced from a conventional release liner coated with the polymer of the present invention has desirable image transfer properties results. Such an image transfer film is able to produce an image with high resolution. In order to transfer the image, the printed films is pressed against the substrate to which the image is to be transferred while the ink is still wet, allowed to dry, and the release liner is carefully peeled away. The image is transferred cleanly with a clean break between the printed image and the surrounding coating. Such a clean break is desirable in that the transferred image does not include a "shadow" of surrounding coating as typically results with image transfer products. Such results are also achieved without the need for supplemental adhesives as the printed image is inherently tacky when wet. Possible substrates to which such an image may be transferred include any facestock such as paper, card stock, cardboard, vinyl, polyester, polyethylene, polypropylene, and even substrates such as glass, ceramic and cloth.

If desired, an image may first be printed to an image transfer film and allowed to dry for later transfer to some other substrate. When it is desired to transfer the image, the image is first dampened with water such as by spraying the printed side of the transfer film and then the transfer film is pressed against the substrate as set forth above. One difference in using the transfer film in this way is that the film is also transferred to the substrate without the clean break achieved when the image is transferred immediately after printing. However, such a method is useful in producing a transfer film with remoistenable, water-activatable adhesive characteristics. Such characteristics can be useful for wallpaper, postage stamps, and a number of other different applications.

Yet another desirable property of the image transfer films of the present invention is that the transferred images, though not waterproof, are water resistant. Once the image has been transferred to a substrate, the removal of the image requires both water and a mechanical shear force for removal. Therefore, such image transfer films can be useful in producing attractive container labels for jars and bottles of food and other products. Such labels will tend to adhere well to the container, but can easily be removed when desired.

As discussed, the polymer emulsion is also useful in producing a coating for rubber articles such as gloves. The same absorbency properties that make the polymer coating useful for making photographic quality printer paper also make the coating useful as a donning coating for items such as rubber examination gloves. The coating is additionally useful as a release coating for rubber articles made by molding techniques. Whether it is used as a donning coating or release coating, the polymer coating of the present invention provides good anti-blocking properties, and the coated rubber articles are less likely to stick to themselves, or to each other when stacked.

When used as a coating for rubber articles, the polymer emulsion is preferably blended with an elastomeric material such as a rubber latex emulsion, most preferably a nitrile rubber latex. The preferred nitrile rubber latex for coating rubber articles is a carboxylated butadiene-acrylonitrile latex product available under the trade name Synthomer 6000, as set forth above. While alone, the cured polymer tends to be fairly brittle, when blended with nitrile rubber latex, the elastic properties of the coating are greatly enhanced with elasticity of 1000% or higher. Furthermore, the inclusion of nitrile rubber latex imparts desirable water resistant properties to the coating, and results in a strong bond between the rubber article and the coating. This makes the coated rubber article less likely to crack after stretching.

In one preferred embodiment, in addition to being diluted with a nitrile rubber latex, the polymer emulsion is blended with an acrylate, silicone, styrene and urethane polymer emulsion. Such an emulsion polymer is disclosed in U.S. patent application Ser. No. 09/215,578, which is incorporated herein by reference. The inclusion of an acrylate, silicone, styrene and urethane polymer emulsion with the polymer coating of the present invention can greatly improve the elasticity of coatings made from the acrylate, silicone, styrene and urethane polymer emulsion alone.

When used as a release coating, the polymers of the present invention have the further desirable property of being able to tolerate high concentrations of the metal salts used as coagulants for the production of rubber articles. This simplifies the manufacturing steps in making rubber articles. In particular, a blend of a nitrile rubber emulsion and a polymer emulsion of the present invention can be combined with a coagulant such as calcium nitrate and used as a preliminary dipping emulsion to replace an emulsion of powder and coagulant such as is used in a conventional assembly line for the manufacture of rubber articles. Surprisingly, it has been discovered that the blending of the polymer emulsion of the present invention with nitrile rubber latex permits the nitrile rubber latex to tolerate high levels of coagulant without coagulating as would occur if the polymer emulsion of the present invention were not included. According to the invention, calcium nitrate levels as high as 35% can be tolerated at temperatures up to 60° C. For the preferred embodiments of the invention in which an ethoxylated (meth)acrylate monomer is included in the monomer mixture, calcium nitrate levels nearing the maximum solubility of calcium nitrate in water, about 43.5% at 60° C., can be tolerated. Such levels are useful for making thick rubber articles such as industrial gloves where high levels of coagulant are required.

In the preferred embodiment, a mold or former such as a glove former is dipped into such a blend to form a first coating on the former. This first coating is then permitted to briefly dry. Once it has dried, it is then dipped into a conventional rubber emulsion and allowed to set. The formed rubber article is then subjected to a leaching step to remove impurities. The rubber article is then dipped into a second blend of nitrile rubber latex and the coating polymers of the present invention and cured. Once cured, the article is stripped from the former, the former is cleaned and the process is repeated. It should be noted that while the first coating will not coagulate prematurely, during the cure step the coating coagulates and cures to provide a coating that is securely bonded to the rubber article.

Since rubber articles are generally turned inside out during the stripping step, the outer coating applied during production is often the inner surface of the finished article. For example, for gloves, the coating applied as the outer coating during manufacture will typically be the donning coating of the finished glove. For those articles that are turned inside out after formation, the first coating which initially serves as a release coating for the former, further acts as anti-block coating for the outer surface of the formed rubber article. The second coating in turn acts as the donning coating for the rubber article.

While the invention has been described with specific reference to its use in forming gloves by multiple dipping steps, the term "coated rubber article" is meant to include a rubber article with a coating adjacent at least one side of the rubber article regardless of how the rubber article was manufactured. Specifically, the term includes those articles in which a rubber article is first formed and then coated with the polymer coating as well as those articles for which the polymer coating is first formed and then the rubber article is molded over the polymer coating. Furthermore, while specific reference is made to nitrile rubber latex articles, the invention is also useful for producing coatings for other rubber articles such as natural rubber latex articles.

The invention will now be described with reference to the following examples.

EXAMPLES 1, 2 AND 3

Three separate polymer emulsions were prepared as set forth in Examples 1, 2 and 3. For each, an initial reactor charge was prepared with deionized water, surfactants, a catalyst and a defoamer. A number of different surfactants were selected to ensure good mixing between the monomers. The specific surfactants used were AIRVOL 540, a polyvinyl alcohol. The AIRVOL 540 is provided as a solid and was diluted with water to a 5.4 weight % solution before addition to the reactor. Other surfactants included Surfynol 465 and Surfynol 485W, nonionic ethoxylated acetylenic surfactants with 65 weight % and 63.75 weight %, respectively, of active ingredients in water solutions. The AIRVOL and Surfynol surfactants are all available from Air Products and Chemicals, Inc. of Allentown, Pa. The reactor charge also included Disponil FES 77, a sodium lauryl ether sulfate surfactant provided as a 32.5 weight % aqueous solution of active ingredients that is available from Henkel of America, Inc.

In addition to the surfactants, the initial reactor charge for each of Examples 1, 2 and 3 further included the sodium salt of ethylenediaminetetraacetic acid, iron(III), or Fe-EDTA, which acts as an activator and oxygen scavenger. In order to control foaming, a small amount of the defoamer, Drewplus L-191, was also added. The amounts of each of the ingredients for the initial reactor charge for each of Examples 1, 2 and 3 are set forth in Table 1.

TABLE 1

Initial Reactor Charge (in parts by weight)

| INGREDIENT | Examples 1–3 |
|---|---|
| deionized water | 442.56 |
| AIRVOL 540 (5.4 wt % aqueous solution) | 151.60 |
| Surfynol 465 | 6.30 |
| Surfynol 485 W | 6.30 |
| Disponil FES 77 | 20.70 |
| Fe-EDTA | 0.04 |
| tertiary butyl hydroperoxide | 2.50 |
| Drewplus L-191 | 0.05 |
| TOTAL | 630.05 |

In preparing the initial reactor charge for each of Examples 1, 2 and 3, all ingredients except the tertiary butyl hydroperoxide initiator and defoamer were first charged to a heated reactor. A high rpm mixer provided the agitation. The mixture in the reactor was purged with nitrogen to remove any dissolved oxygen and the defoamer was added.

An accelerator solution of the sodium salt of hydroxymethanesulfinic acid in water was then prepared according to Table 2. Identical accelerator solutions were used for each of Examples 1, 2 and 3. The preferred accelerator is provided by Henkel of North America.

TABLE 2

Accelerator Solution (in parts by weight)

| INGREDIENT | Examples 1–3 |
|---|---|
| Deionized water | 178.00 |
| Hydroxymethanesulfinic acid, sodium salt | 2.00 |
| TOTAL | 180.00 |

For each of Examples 1, 2 and 3, two different monomer mixtures were separately prepared as set forth in Table 3.

TABLE 3

Monomer Mixtures (in parts by weight)

| INGREDIENT | Example 1 | | Example 2 | | Example 3 | |
|---|---|---|---|---|---|---|
| | Mix 1 | Mix 2 | Mix 1 | Mix 2 | Mix 1 | Mix 2 |
| Butylacrylate | 47.30 | 75.00 | 46.10 | 72.40 | 46.10 | 72.40 |
| Methylacrylate | 30.70 | 48.40 | 30.70 | 48.40 | 30.70 | 48.40 |
| 2-hydroxyethylmethacrylate | 70.00 | 101.00 | 68.20 | 98.10 | 68.20 | 98.10 |
| Ethoxylated 2-hydroxyethyl-methacrylate-15 | 0.00 | 0.00 | 5.70 | 9.30 | 0.00 | 0.00 |
| Ethoxylated 2-hydroxyethyl-methacrylate-10 | 0.00 | 0.00 | 0.00 | 0.00 | 5.70 | 9.30 |
| N-vinylpyrrolidone | 27.50 | 32.60 | 25.10 | 29.30 | 25.10 | 29.30 |
| Methacrylic acid | 12.00 | 12.00 | 12.00 | 12.00 | 12.00 | 12.00 |
| acrylic acid | 12.00 | 12.00 | 12.00 | 12.00 | 12.00 | 12.00 |
| Methylmethacrylate | 25.10 | 39.20 | 25.10 | 39.20 | 25.10 | 39.20 |
| Trifluoroethyl-methacrylate | 3.00 | 4.50 | 2.70 | 4.00 | 2.70 | 4.00 |
| TOTAL | 227.60 | 324.70 | 227.60 | 324.70 | 227.60 | 324.70 |

For each of the Examples, the individual reactants of each of the two monomer mixtures were combined in separate stirred containers and were maintained under constant and vigorous agitation. The pH of each of the two monomer mixtures was measured and was about 3.3 for the first monomer mixture and about 4.5 for the second monomer mixture. A 16% ammonia solution was added to each monomer mixture to bring the pH up to between about 7.0 and 8.0 for each monomer mixture. An 80 weight % solution of dimethylaminoethyl acrylate, methyl chloride quaternary was then added to each monomer mixture as the quaternary amine (meth)acrylate. The particular quaternary amine (meth)acrylate used was Ageflex FA1Q80MC, available from CPS Chemical Company, Inc. of Old Bridge, N.J. Upon adding the Ageflex, the monomer mixtures appear slightly cloudy. Deionized water was then added to each monomer mixture until the solution became clear.

The same procedure was repeated for each of Examples 1, 2 and 3. The primary differences between the examples being the addition of ethoxylated (meth)acrylate monomer to the first and second monomer mixtures. For Example 1, no ethoxylated (meth)acrylate was added. For Example 2, each of the first and second monomer mixtures included an amount of an ethoxylated hydroxyethylmethacrylate with an average of 15 ethylene oxide units as the ethoxylated (meth)acrylate monomer. Such a product is available from Nippon Nyukazai Co., Ltd. of Tokyo, Japan as an 88% by weight solution with 12% by weight propyleneglycol monomethylether under the product designation MA-15OMF. For Example 3, each of the first and second monomer mixtures included an amount of an ethoxylated hydroxyethylmethacrylate with an average of 10 ethylene oxide units as the ethoxylated (meth)acrylate monomer. Such a product is available from Nippon Nyukazai Co., Ltd. of Tokyo, Japan under the product designation MA-100A.

The amount of each ingredient added to the two monomer mixtures of each of Examples 1, 2 and 3 is set forth in Table 4.

TABLE 4 pH Adjustment of Monomer Mixtures (in parts by weight)

| | Examples 1–3 | |
|---|---|---|
| INGREDIENT | Mix 1 | Mix 2 |
| Monomer Mixture | 227.60 | 324.70 |
| 16% ammonia solution | 25.40 | 28.30 |
| Ageflex FA1Q80MC (80% by weight) | 44.40 | 37.60 |
| Deionized water | 21.00 | 23.00 |
| TOTAL | 319.40 | 415.60 |

At this point, for Example 1, the nitrogen purge to the reactor was discontinued and the tertiary butyl hydroperoxide as set forth in Table 1 was added to the reactor. The accelerator solution was slowly introduced into the reactor along with the slow introduction of the first monomer mixture. The accelerator solution was fed into the reactor at a rate of 0.75 parts by weight per minute for four hours. The first monomer mixture was added to the reactor at 4.07 parts by weight per minute for 78 minutes. In order to prevent the first monomer mixture from separating, constant and vigorous agitation was maintained during the entire addition.

The first monomer mixture was allowed to react by an exothermic reaction. The reactor temperature was maintained between 48 and 53° C. during the reaction. Constant agitation of the reactor was also maintained during the process. The reaction was allowed to proceed for fifteen minutes after the last of the first monomer solution had been charged to the reactor.

The second monomer mixture was then added to the reactor at a rate of 4.07 parts by weight per minute for 102 minutes. Again, constant agitation was maintained for both the monomer mixture being fed into the reactor and the reactants. The reaction temperature was maintained between 48 and 53° C. during this period.

In order to encourage the complete reaction of the monomers, at twenty and forty minutes after the last of the second monomer mixture had been added, 0.4 parts by weight of a 70 weight % solution of tert butyl hydroperoxide was added to the reactor in a cook-off step for a total of 0.8 parts of the solution. The reactor temperature was maintained for an additional 30 minutes and then the batch was allowed to cool to 35° C. Once the batch had cooled, in order to adjust the total solids content to 35 weight %, and to adjust the pH to between 7.5 and 8.0, deionized water and a 16% ammonia solution were added to the polymer coating emulsion. An additional amount of Drewplus L-191 was added as a defoamer, and Kathon LX was added as a biocide. Kathon LX is a biocide with 1.4 weight % active ingredients, available from Rohm & Haas of Philadelphia, Pa. The emulsion was then filtered through a 55-micron filter. The specific amounts of post reaction additives are set forth below in Table 5.

TABLE 5

Post-Polymerization Rinse Solution and Additives (in parts by weight)

| INGREDIENT | Examples 1–3 |
| --- | --- |
| 16% ammonia solution | 90.00 |
| tertiary butyl hydroperoxide (70% solution) | 0.80 |
| Drewplus L-191 | 0.10 |
| Kathon LX (1.5% solution) | 0.30 |
| Deionized water | 264.50 |
| TOTAL | 355.70 |

The identical procedures as set forth above were repeated for Examples 2 and 3. A Differential Scanning Calorimetry profile for the polymer of each of Examples 1–3 showed major glass transition temperature peaks occur at about 33° C. with minor glass transition temperature peaks at 75° C. and −13° C.

EXAMPLE 4

An amount of the polymer emulsion of Example 2 was diluted with a nitrile rubber latex to form a coating material. The diluted emulsion contained 93.25 weight % polymer emulsion on a dry basis and 6.75 weight % of nitrile rubber latex on a dry basis. The nitrile rubber used was a carboxylated butadiene-acrylonitrile rubber known as Synthomer 6000, available from Synthomer Ltd. of Harlow, Great Britain. When mixing the polymer with the nitrile rubber latex, it is important that the polymer be slowly added under good agitation. The agitation was continued for 30 minutes to ensure good mixing.

A first portion of the coating was applied to a number of sheets of 60 pound super high gloss paper at a coat weight of 24 grams per square meter. A second portion was applied to a number of sheets of clear, cast vinyl film at a coat weight of 27 gsm. A third portion was applied to a number of sheets of silicone-coated paper of the type commonly used as a release liner for pressure sensitive adhesives at a coat weight of 16 gsm. The various coated facestocks were cured in an oven maintained between 80 and 90° C. for about seven minutes. Each of the coated facestocks exhibited excellent clarity and gloss, the high gloss having been achieved without any further mechanical treatment. The gloss for each of the three types of facestock was measured according to ASTM test method D523-89 with a micro-gloss reflectometer of the type manufactured by BYK Gardner of Germany. Measurements were taken for the 75° reflectance, 60° reflectance and 20° reflectance. Five measurements were taken for each film at each of the three different reflectance angles and the results were averaged. The gloss measurements measured as percent reflectance are summarized as follows in Table 6 as follows:

TABLE 6

Gloss Measurements for Ink Jet Printer Films

| FILM | MICRO-GLOSS (% reflectance) | | | | | |
| --- | --- | --- | --- | --- | --- | --- |
| | at 75° angle | | at 60° angle | | at 20° angle | |
| High Gloss Paper | | 99.3 | | 77.9 | | 35.2 |
| | | 100.2 | | 76.7 | | 29.0 |
| | | 99.3 | | 77.8 | | 31.2 |
| | | 98.0 | | 76.0 | | 30.3 |
| | | 99.9 | | 77.5 | | 29.5 |
| | Average: | 99.34 | Average: | 77.18 | Average: | 31.04 |
| Clear Vinyl | | 100.9 | | 83.1 | | 54.4 |
| | | 100.6 | | 82.1 | | 51.3 |
| | | 100.0 | | 81.0 | | 46.4 |
| | | 100.4 | | 82.1 | | 52.0 |
| | | 99.3 | | 80.8 | | 50.6 |
| | Average: | 100.24 | Average: | 81.82 | Average: | 50.94 |
| Release Liner | | 96.9 | | 64.0 | | 21.0 |
| | | 97.8 | | 53.8 | | 17.7 |
| | | 97.0 | | 64.9 | | 19.8 |
| | | 98.1 | | 53.1 | | 17.0 |
| | | 98.2 | | 61.2 | | 18.1 |
| | Average: | 97.60 | Average: | 59.4 | Average: | 18.72 |

Color images were then printed on the coated high gloss paper and the coated clear vinyl films using a Hewlett-Packard DeskJet 890C ink jet printer. For the high gloss paper, the printer was set for premium photo quality printing for paper. For the clear vinyl film, the printer was set for premium photo quality printing for transparencies. After printing, the coated facestocks still retained excellent gloss characteristics and displayed very high resolution with little cracking. For the paper film, the printed sheets were dry to the touch in three to five minutes. The clear vinyl films were dry to the touch in five to seven minutes. The films also exhibited good flexibility with neither the coating nor the image separating from the substrate or cracking.

Color images were then printed on the sheets of coated release liner, also using the Hewlett-Packard DeskJet 89C printer set for premium quality printing for transparencies. While still wet, the release liners were pressed against various substrates such as cardboard, vinyl, glass and ceramic. The release liners were allowed to dry for about five to seven minutes. For each, the release liner was peeled from the substrate. The printed images were cleanly transferred to the various substrates with virtually no defects and 100% transfer, with clean breaks around the images with little surplus coating adhering to the substrates. The printed images were crack free and adhered well to each of the various substrates.

EXAMPLES 5, 6 and 7

For Example 5, an acrylate, silicone, styrene and urethane polymer emulsion was prepared as the sequentially polymerized reaction product of two different monomer mixture as set forth in Example 1 of U.S. patent application Ser. No. 09/215,578. The acrylate, silicone, styrene and urethane polymer was provided as an aqueous emulsion with a solids content of 55 weight %. This Example was used as a comparative sample.

For Example 6, a first amount of the polymer emulsion of Example 2 was added to a nitrile rubber latex in the proportion of 20 weight % polymer coating on a dry basis to 80 weight % nitrile rubber (Synthomer 6000) on a dry basis. The polymer emulsion was added to the nitrile rubber latex under constant and vigorous agitation.

For Example 7, a second amount of the polymer emulsion of Example 2 and a portion of the acrylate, silicone, styrene and urethane polymer emulsion of Example 5 were added to a nitrile rubber latex (Synthomer 6000). The ingredients were combined in the amount of 16 weight % of the polymer emulsion of Example 2 on a dry basis, 20 weight % of the acrylate, silicone, styrene and urethane polymer emulsion on a dry basis and 64 weight % of nitrile rubber latex on a dry basis. As with Example 6, for Example 7 the polymer emulsion and acrylate, silicone, styrene and urethane polymer emulsion were added to the nitrile rubber latex under vigorous agitation.

For each of the Example 6 and 7 emulsions, the agitation was continued for 30 minutes to ensure good mixing. Each of these polymer emulsions of Examples 5, 6 and 7 was applied at a dry coat weight of 70 grams per square meter to a release liner of the type commonly used for pressure sensitive adhesives as set forth above. The coated release liners were dried at 70° C. for ten minutes and cured at 120° C. for ten minutes. The samples were cooled and a dumbbell shaped test sample film with a 5 mm by 20 mm test area was cut from each of the three release liner sheets. Stretch and strength tests were then performed on the three sample films according to ASTM test method D412-92. The test results are summarized in Table 7.

TBLE 7

Mechanical Properties of Coatings

| | MODULUS (psi) | | | | TENSILE |
|---|---|---|---|---|---|
| | at 100% | At 300% | at 500% | ELONGATION AT BREAK (%) | STRENGTH AT BREAK (psi) |
| Example 5 | 282 | 398 | — | 428 | 552 |
| Example 6 | 125 | 142 | 179 | 2050 | 121 |
| Example 7 | 161 | 188 | 233 | 1363 | 234 |

From the results of this testing, it is apparent that coatings made from the coating polymer of the present invention (Example 6) have excellent stretch and strength characteristics. The present invention is also useful in modifying the physical properties of an acrylate, silicone, styrene and urethane polymer emulsion (Example 7) in order to improve both stretch and strength of the resulting coating compared to an acrylate, silicone, styrene and urethane polymer emulsion coating alone (comparative Example 5). It has been found that for coatings made from the coating polymers of the present invention, a percent elongation at break in the range of 1500 to 2000 or higher can be achieved. For coatings made from the coating polymers of the present invention blended with an acrylate, silicone, styrene and urethane polymer emulsion such as those disclosed in U.S. patent application Ser. No. 09/215,578, a percent elongation at break in the range of 1500 to 2000 or higher can be achieved. The coating of Example 6 is particularly useful as the outer coating for nitrile rubber latex gloves used in clean room environments in which the gloves must be both powder-free and silicon-free. For surgeon's gloves, the coating of Example 7 is preferred as an outer coating for a natural latex glove as such a coating provides a somewhat better tactile feel than a coating such as that of Example 6.

EXAMPLES 8, 9, 10 and 11

For Examples 8 and 9, coated nitrile rubber latex gloves were formed with coating polymers of the present invention. For Example 8, a mold release/coagulant emulsion was formed using the polymer coating emulsion of Example 6 to which 33% by weight on a wet basis of calcium nitrate was added. For Example 9, a mold release/coagulant emulsion was formed using the polymer coating emulsion of Example 7 to which 33% by weight on a wet basis of calcium nitrate was added. These resulting emulsions were then individually applied to hand-shaped glove molds by dipping the glove molds into a container of each of the emulsion mixtures. Upon removal from the emulsion mixture, the glove molds were briefly dried. Each of the two coated glove molds was then dipped in compounded Synthomer 6000, a nitrile rubber latex, and was set by briefly heating each of the coated molds. Each coated mold was leached in water for about seven minutes. The coated glove mold of Example 8 was then dipped into a container of the polymer emulsion as set forth in Example 7. The coated glove mold of Example 9 was then dipped into a container of the polymer emulsion of Example 5. Each of the two coated molds was then cured in an oven maintained between 120 and 140° C. for twenty to thirty minutes. The formed gloves were then stripped from the molds by turning them inside out such that the outer coating applied during the production step became the donning coating.

For Examples 10 and 11, coated natural latex gloves were formed with coating polymers of the present invention. For Example 10, a mold release/coagulant emulsion was formed using the polymer coating emulsion of Example 6 to which 33% by weight on a wet basis of calcium nitrate was added. For Example 11, a mold release/coagulant emulsion was formed using the polymer coating emulsion of Example 7 to which 33% by weight on a wet basis of calcium nitrate was added. These resulting emulsions were then individually applied to hand-shaped glove molds by dipping the glove molds into a container of each of the emulsion mixtures. Upon removal from the emulsion mixture, the glove molds were briefly dried. Each of the two coated glove molds was then dipped in compounded Vultax, a natural rubber latex available from General Latex and Chemical Corp. of Cambridge, Mass., and was set by briefly heating each of the coated molds. Each coated mold was leached in water for about seven minutes. The coated glove mold of Example 10 was then dipped into a container of the polymer emulsion as set forth in Example 7. The coated glove mold of Example 11 was then dipped into a container of the polymer emulsion of Example 5. Each of the two coated molds was then cured in an oven maintained between 120 and 140° C. for about fifteen to twenty minutes. The formed gloves were then stripped from the molds by turning them inside out such that the outer coating applied during the production step became the donning coating.

For each of Examples 8, 9, 10 and 11, the gloves stripped cleanly and easily from the respective molds and only minor cleaning was required to prepare the molds for further glove forming. The finished gloves exhibited excellent strength and elasticity. After stretching, there was no visible flaking or cracking of the coatings. The coatings for the gloves were further examined microscopically and no cracks were detected.

It has further been discovered that desirable properties can be achieved when an acrylic copolymer, especially those used in forming pressure sensitive adhesives, is blended with an elastomeric material such as a rubber latex emulsion, especially nitrile rubber latex. For example, by blending an amount of nitrile rubber latex with an acrylic copolymer pressure sensitive adhesive of the type disclosed in U.S. Pat. No. 5,895,801, the contents of which are incorporated by reference, and applying the blend to a suitable substrate, an adhesive construct with improved properties is formed. In particular, the adhesive of such a construct provides improved removability properties compared to the use of the same pressure sensitive adhesive when applied directly to a substrate without first blending it with a nitrile rubber latex. It is preferred that the acrylic copolymer be blended with about 5–50% by weight, on a dry basis, of nitrile rubber latex.

As one example, a pressure sensitive adhesive of the type disclosed in U.S. Pat. No. 5,895,801 was blended with 15% by weight on a dry basis of nitrile rubber latex, and the blend was applied to a sheet of banner vinyl as a facestock with a silicone release liner. After one week of aging at 70° C., the blended adhesive showed significant improvement in retaining the adhesive properties when compared to a non-blended adhesive. It is believed that the inclusion of nitrile rubber latex with the adhesive prevents the migration of plasticizers from the facestock into the adhesive. Such migration can have adverse affects on the properties of an adhesive.

As a second example, a blend of the same adhesive and 50% by weight, on a dry basis, of nitrile rubber latex was applied to a sheet of banner vinyl as a facestock. The resulting construct was then applied to a number of substrates including paper, cardboard, glass, stainless steel, polypropylene and polyethelene. The blended adhesive showed improved removability from all substrates compared to an unblended adhesive.

The invention has been described by exemplary and preferred embodiments, but is not to be so limited. Persons skilled in the art will appreciate that a variety of modifications may be made without departing from the scope of the invention, which is limited by the following claims.

What is claimed is:

1. A polymer comprising the reaction product of a monomer mixture comprising:
   an alkyl (meth)acrylate;
   a quaternary amine (meth)acrylate;
   a hydroxyalkyl (meth)acrylate;
   an N-vinyl lactam;
   an ethylenically unsaturated carboxylic acid; and
   a fluorinated (meth)acrylate.

2. The polymer of claim 1 comprising at least two different alkyl (meth)acrylates, wherein one of the alkyl (meth)acrylates, if homopolymerized, would have a $T_g$ of less than about 25° C.

3. The polymer of claim 1 further comprising an ethoxylated (meth)acrylate.

4. The polymer of claim 3 wherein the ethoxylated (meth)acrylate is selected from the group consisting of ethoxylated hydroxyalkyl (meth)acrylate with an average of between 5 and 20 ethylene oxide units.

5. The polymer of claim 4 wherein the ethoxylated hydroxyalkyl (meth)acrylate is selected from the group consisting of ethoxylated hydroxyethylmethacrylate with an average of between 10 and 15 ethylene oxide units.

6. The polymer of claim 1 further comprising a hard monomer.

7. The polymer of claim 6 wherein the hard monomer is selected from the group comprising methylmethacrylate, isobutyl methacrylate, styrene and styrenic monomers.

8. The polymer of claim 1 wherein the alkyl(meth)acrylate is also a hard monomer.

9. The polymer of claim 8 wherein the alkyl(meth)acrylate is selected from the group consisting of methylmethacrylate and isobutyl methacrylate.

10. The polymer of claim 1 wherein the alkyl(meth)acrylate is selected from the group consisting of alkyl (meth)acrylates having from 1 to 10 carbon atoms in the alkyl group.

11. The polymer of claim 10 wherein the alkyl(meth)acrylate is selected from the group consisting of methylacrylate, ethyl acrylate, butyl acrylate, ethylhexyl acrylate, isooctyl acrylate, methyl methacrylate and isobutyl methacrylate.

12. The polymer of claim 1 wherein the quaternary amine (meth)acrylate comprises dimethylaminoethylacrylate methyl chloride quaternary.

13. The polymer of claim 1 wherein the hydroxyalkyl (meth)acrylate comprises 2-hydroxyethyl methacrylate.

14. The polymer of claim 1 wherein the N-vinyl lactam comprises an N-vinylcaprolactam.

15. The polymer of claim 1 wherein the N-vinyl lactam comprises N-vinylpyrrolidone.

16. The polymer of claim 1 wherein the ethylenically unsaturated carboxylic acid is selected from the group consisting of alkyl (meth)acrylic acids, carboxyethyl acrylates and itaconic acids.

17. The polymer of claim 16 wherein the ethylenically unsaturated carboxylic acid is selected from the group consisting of acrylic acid and methacrylic acid.

18. The polymer of claim 1 wherein the fluorinated (meth)acrylate comprises trifluoroethyl methacrylate.

19. The polymer of claim 1 wherein the monomer mixture comprises a first monomer mixture, and the polymer comprises the reaction product of the sequential polymerization of the first monomer mixture and a second monomer mixture, the second monomer mixture independently comprising:
   an alkyl (meth)acrylate;
   a quaternary amine (meth)acrylate;
   a hydroxyalkyl (meth)acrylate;
   an N-vinyl lactam;
   an ethylenically unsaturated carboxylic acid; and
   a fluorinated (meth)acrylate.

20. The polymer of claim 19 wherein the second monomer mixture has a higher concentration of ethylenically unsaturated carboxylic acid than the first monomer mixture.

21. A coated substrate comprising a substrate coated with the polymer of claim 19.

22. The coated substrate of claim 21 wherein the substrate is selected from the group consisting of paper, card stock, cardboard, vinyl, polyester, polyethylene, polypropylene and release liner.

23. The polymer of claim 1 wherein the quaternary amine (meth)acrylate is provided in an amount between about 5 and about 15 weight % of the monomer mixture on a dry basis; the hydroxyalkyl (meth)acrylate is provided in an amount between about 5 and about 35 weight % of the monomer mixture on a dry basis; the N-vinyl lactam is provided in an amount between about 5 and about 15 weight % of the monomer mixture on a dry basis; the ethylenically unsaturated carboxylic acid is provided in an amount between about 4 and about 15 weight % of the monomer mixture on a dry basis; and the fluorinated (meth)acrylate is provided in a positive amount less than about 5 weight % of the monomer mixture on a dry basis.

24. A construction comprising a facestock coated with the polymer of claim 1.

25. The construction of claim 24 wherein the polymer is blended with an elastomeric material.

26. The construction of claim 25 wherein the elastomeric material is nitrile rubber.

27. The construction of claim 25 wherein the coating is applied at a coat weight between about 10 and 50 gsm.

28. The construction of claim 24 wherein the alkyl (meth)acrylate of the polymer includes between 1 and 10 carbon atoms in the alkyl group.

29. The construction of claim 24 wherein the polymer comprises at least two different alkyl (meth)acrylates, wherein one of the alkyl (meth)acrylates, if homopolymerized, would have a $T_g$ of less than about 25° C.

30. The construction of claim 24 wherein the polymer further comprises an ethoxylated (meth)acrylate.

31. The construction of claim 24 wherein the monomer mixture is a first monomer mixture, and the polymer comprises the reaction product of the sequential polymerization of the first monomer mixture and a second monomer mixture, the second monomer mixture independently comprising:
    an alkyl (meth)acrylate;
    a quaternary amine (meth)acrylate;
    a hydroxyalkyl (meth)acrylate;
    an N-vinyl lactam;
    an ethylenically unsaturated carboxylic acid; and
    a fluorinated (meth)acrylate.

32. The construction of claim 31 wherein the second monomer mixture further comprises an ethoxylated (meth)acrylate.

33. The construction of claim 31 wherein second monomer mixture has a higher concentration of ethylenically unsaturated carboxylic acid than the first monomer mixture.

34. A coated rubber article comprising a rubber article coated with the polymer of claim 1.

35. The coated rubber article of claim 34 wherein the polymer is blended with an elastomeric material.

36. The coated rubber article of claim 35 wherein the elastomeric material is nitrile rubber.

37. The coated rubber article of claim 34 wherein the alkyl (meth)acrylate of the polymer includes between 1 and 10 carbon atoms in the alkyl group.

38. The coated rubber article of claim 34 wherein the polymer comprises at least two different alkyl (meth)acrylates, wherein one of the alkyl (meth)acrylates, if homopolymerized, would have a $T_g$ of less than about 25° C.

39. The coated rubber article of claim 34 wherein the polymer further comprises an ethoxylated (meth)acrylate.

40. The coated rubber article of claim 34 wherein the monomer mixture is a first monomer mixture, and the polymer comprises the reaction product of the sequential polymerization of the first monomer mixture and a second monomer mixture, the second monomer mixture independently comprising:
    an alkyl (meth)acrylate;
    a quaternary amine (meth)acrylate;
    a hydroxyalkyl (meth)acrylate;
    an N-vinyl lactam;
    an ethylenically unsaturated carboxylic acid; and
    a fluorinated (meth)acrylate.

41. The coated rubber article of claim 34 wherein the polymer is a first polymer and the monomer mixture is a first monomer mixture, the first polymer is adjacent a first side of the rubber article, the rubber article further comprising a second polymer applied to a second side of the rubber article, the second polymer comprising the reaction product of a second monomer mixture independently comprising:
    an alkyl (meth)acrylate;
    a quaternary amine (meth)acrylate;
    a hydroxyalkyl (meth)acrylate;
    an N-vinyl lactam;
    an ethylenically unsaturated carboxylic acid; and
    a fluorinated (meth)acrylate.

42. The coated rubber article of claim 41 wherein the second monomer mixture further comprises an ethoxylated (meth)acrylate.

43. The coated rubber article of claim 41 wherein second monomer mixture has a higher concentration of ethylenically unsaturated carboxylic acid than the first monomer mixture.

44. A method for coating an article comprising the step of coating an article with the polymer of claim 1.

45. The method of claim 44 further comprising the step of blending the polymer with an elastomeric material before coating the article.

46. The method of claim 45 wherein the elastomeric material is a rubber latex emulsion.

47. The method of claim 45 wherein the elastomeric material is a nitrile rubber latex.

48. The method of claim 47 wherein the article is a substrate selected from the group consisting of paper, card stock, cardboard, vinyl, polyester, polyethylene, polypropylene and release liner.

49. The method of claim 47 wherein the article is a rubber article.

50. A method for coating an article comprising the steps of:
    forming a coating comprising the polymer of claim 1 over a mold; and
    forming the article over the coating on the mold.

51. The method of claim 50 further comprising the step of blending the polymer with a nitrile rubber latex prior to forming the coating over the mold.

52. The method of claim 51 wherein the article is a rubber article.

53. A polymer comprising the sequential polymerization reaction product of first and second monomer mixtures, each of the first and second monomer mixtures independently comprising:
    an alkyl (meth)acrylate;
    a quaternary amine (meth)acrylate;
    a hydroxyalkyl (meth)acrylate;
    an N-vinyl lactam;
    an ethylenically unsaturated carboxylic acid; and
    a fluorinated (meth)acrylate.

54. The polymer of claim 53 wherein each of the first and second monomer mixtures further comprises an ethoxylated (meth)acrylate.

55. The polymer of claim 53 wherein each of the first and second monomer mixtures further comprises a hard monomer.

56. The polymer of claim 53 wherein second monomer mixture has a higher concentration of ethylenically unsaturated carboxylic acid than the first monomer mixture.

57. A coated rubber article comprising a rubber article coated with the polymer of claim 53.

58. The coated rubber article of claim 57 wherein the rubber article is a glove.

59. The polymer of claim 53 wherein, for each of the first and second monomer mixtures the quaternary amine (meth) acrylate is provided in an amount between about 5 and about 15 weight % of the monomer mixture on a dry basis; the hydroxyalkyl (meth)acrylate is provided in an amount between about 5 and about 35 weight % of the monomer mixture on a dry basis; the N-vinyl lactam is provided in an amount between about 5 and about 15 weight % of the monomer mixture on a dry basis; the ethylenically unsaturated carboxylic acid is provided in an amount between about 4 and about 15 weight % of the monomer mixture on a dry basis; and the fluorinated (meth)acrylate is provided in a positive amount less than about 5 weight % of the monomer mixture on a dry basis.

60. The polymer of claim 55 wherein the alkyl(meth) acrylate is selected from the group consisting of alkyl (meth)acrylates having from 1 to 10 carbon atoms in the alkyl group; the quaternary amine (meth)acrylate comprises dimethylaminoethylacrylate methyl chloride quaternary; the hydroxyalkyl (meth)acrylate comprises 2-hydroxyethyl methacrylate; the N-vinyl lactam comprises N-vinylpyrrolidone; the ethylenically unsaturated carboxylic acid is selected from the group consisting of alkyl (meth)acrylic acids, carboxyethyl acrylates and itaconic acids; and the fluorinated (meth)acrylate comprises trifluoroethyl methacrylate.

61. The polymer of claim 60 further comprising ethoxylated hydroxyethyl-methacrylate with an average of between 10 and 15 ethylene oxide units.

62. A method for coating an article comprising the step of coating an article with the polymer of claim 53.

63. The method of claim 62 further comprising the step of blending the polymer with an elastomeric material before coating the article.

64. The method of claim 63 wherein the elastomeric material is a rubber latex emulsion.

65. The method of claim 63 wherein the elastomeric material is a nitrile rubber latex.

66. The method of claim 65 wherein the article is a substrate selected from the group consisting of paper, card stock, cardboard, vinyl, polyester, polyethylene, polypropylene and release liner.

67. The method of claim 65 wherein the article is a rubber article.

68. A method for coating an article comprising the steps of:

forming a coating comprising the polymer of claim 53 over a mold; and forming the article over the coating on the mold.

69. The method of claim 68 further comprising the step of blending the polymer with a nitrile rubber latex prior to forming the coating over the mold.

70. The method of claim 69 wherein the article is a rubber article.

* * * * *